United States Patent Office 3,320,221
Patented May 16, 1967

3,320,221
METHOD OF PRODUCING ACRYLONITRILE COPOLYMERS
Marvin Wishman, White Plains, N.Y., Richard E. Anderson, Plainfield, N.J., Frederic Detoro, Pensacola, Fla., and Peter Jarovitzky, Astoria, N.Y., assignors to American Cyanamid Company, New York, N.Y., a corporation of Maine
No Drawing. Filed Nov. 24, 1961, Ser. No. 154,839
5 Claims. (Cl. 260—85.5)

This invention relates to certain new and useful improvements in a method of producing acrylonitrile copolymers and, more particularly, is concerned with an improved method of preparing a polymer of a mixture of copolymerizable materials including a major proportion (more than 50%) by weight of acrylonitrile and a minor proportion (less than 50%) by weight of at least one basic monomer, more particularly a vinyl-substituted heterocyclic tertiary amine, e.g., a vinylpyridine, which is copolymerizable with acrylonitrile. The mixture of copolymerizable materials optionally may include one or more non-basic monomers which are copolymerizable with the acrylonitrile and the basic monomer, for instance non-basic monomers containing a $CH_2=C<$ grouping, e.g., methyl acrylate, methyl methacrylate, vinyl acetate, acrylamide, methacrylonitrile, etc.

Copolymers of acrylonitrile and a basic monomer such as a vinylpyridine, e.g., a methylvinylpyridine and specifically 2-methyl-5-vinylpyridine, previously have been made, for instance by the continuous method described in Mallison U.S. Patent No. 2,777,832 and by the batch method described in Example 1 of Price and Thomas U.S. Patent No. 2,840,550. It has been found that copolymers of acrylonitrile and a vinylpyridine or other vinyl-substituted heterocyclic tertiary amine (with or without a third monomer, e.g., vinyl acetate) that are produced by either of these methods contain fractions that have a low molecular weight and a high content of basic component, e.g., vinylpyridine. As a result, such fractions are soluble in water at a pH of less than 3 as well as in acetone.

In copolymers containing fractions of low molecular weight and having a high content of a basic monomer such as a vinylpyridine, the molecular-weight distribution and the uniformity of chemical constitution throughout the copolymer are relatively poor. Such irregularities and lack of uniformity are reflected in the processing characteristics and properties of shaped articles or structures made from such copolymers. For example, when these copolymers are used in making filamentary materials, cloudy solutions are frequently obtained. Also, the solutions sometimes have unsatisfactory spinning characteristics such as relatively low pullaway speeds. Additionally, the spun fibers made from solutions of such non-uniform copolymers often show non-uniform dyeing characteristics due mainly to variations in the amount of basic monomer throughout the copolymer.

The present invention is based on our discovery that the foregoing difficulties can be obviated and polymers of more uniform molecular-weight distribution and more uniform chemical constitution throughout can be obtained by modification of the usual polymerization technique. In this modification there is employed a pre-reactor (pre-reaction zone) wherein operating conditions are such that polymerization is initiated quickly and the overall reaction provides polymer of uniform molecular-weight distribution and chemical constitution in the shortest possible time. More particularly, our invention is based on the following discoveries and observations.

Acrylonitrile suspension-type polymerization studies indicate that a considerable amount of polymer is formed in solution prior to leaving the aqueous phase. It has been found that this polymer is of relatively low molecular weight when compared with the polymer formed later. When, for example, a methylvinylpyridine (MVP) is one of the monomers and sodium chlorate and sodium sulfite comprise the catalyst system employed, the amount of solution polymerization which takes place is even larger than that otherwise encountered. Such a polymerization must be conducted in an aqueous acidic medium so that all of the MVP is in solution at the start of the reaction. The first polymer that forms in solution contains a larger amount of MVP than would be expected from the MVP ratio used. Since polymers containing MVP are more soluble in an aqueous acidic media than non-MVP-containing polymers, these newly formed fundamental particles stay in solution longer than polymers of similar molecular weight without MVP. Those growing radicals containing larger amounts of MVP remain in solution longer than those growing radicals with little MVP, so that the former fundamental particles yield lower-molecular-weight polymers. Those growing radicals containing the greatest amount of MVP possess the greatest positive charge so that anions are more readily attracted to them. Among these anions is the $HSO_3^-$ anion introduced as $Na_2SO_3$. $HSO_3^-$ is an excellent chain-transfer agent, so that MVP-containing growing sites are also sites of increased amounts of chain transfer. High MVP-containing growth sites tend to remain low in molecular weight due to both solubility and chain transfer. Thus, lack of growth to high molecular weight tends to be a function of the MVP content.

Discussion up to this point has been concerned with "Type I" particles which are composed of several fundamental or ultimate particles. The ultimate particles are macromolecular in nature. When these particles leave the solution to form a latex particle, more rapid suspension polymerization starts at that site. The latex particles are discrete particles, insoluble in water, and are larger than the Type I particles. The molecular weight increases rapidly due to a reduction of the amount of chain transfer occurring and of the rate of termination. However, due to the higher positive charge more chain transfer than normal can still be expected. Such latex particles have reduced tendency to aggregate since they carry a relatively high charge. Another type of particle also has been observed. This type consists of clusters or aggregates of latex particles which may exist in suspenion. A fourth type of particle is the final grain in a polymer crumb. The final grain consists of many aggregates, and may vary in average size from several microns to 150 microns.

It has been found that a separation of polymer in accord with final grain size results in a separation according to both molecular weight and MVP content. The smaller grains contain more MVP and are of lower molecular weight. Such observations and data tend to confirm the mechanism described above.

It has also been observed from fractionation studies that the molecular-weight distribution of a ternary polymer obtained by polymerization of a polymerizable mixture of about 85% acrylonitrile, 7.5% vinyl acetate and 7.5% 2-methyl-5-vinylpyridine is in agreement with the proposed mechanism. Each of the polymers fractionated indicate the presence of a considerable amount of low-molecular-weight polymer containing much more MVP than the polymer average. Additionally, it has been noted that the reduction of polymer branching during continuous polymerization is related to the amount of chain transfer with $HSC_3^-$.

Acrylonitrile-vinylpyridine copolymers, and more particularly tenary polymers of acrylonitrile, vinyl acetate and 2-methyl-5-vinylpyridine, that have been prepared by within the range of from about 35° C. to about 65° C. The temperatures in the pre-reactor and in the main reactor may be the same or different within the aforementioned ranges.

It is desirable to conduct the process of the present invention in the absence of oxygen, which has a definite inhibiting effect on the polymerization reaction. Suitable inert gases, such as nitrogen and carbon dioxide, may be used to displacec air in the reaction zone.

With the preferred redox-catalyst system, polymerization is effected in an aqueous medium having a pH of 4.0 or less, advantageously from about 2.0 to about 3.6. In some cases the pH in the pre-reactor advantageously is below 2.0 e.g., from 1.0 to 1.9.

In practicing the present invention to produce fiber-forming (fiber-formable) acrylonitrile copolymers, the monomeric material comprises more than 50%, more particularly at least 70%, by weight of acrylonitrile, while the remainder is constituted of at least one other different ethylenically unsaturated material which is copolymerizable with acrylonitrile and which includes a vinyl-substituted tertiary heterocyclic amine, e.g., a vinylpyridine. The present invention provides particularly good results in preparing a ternary polymer of monomeric material comprising at least 80% by weight of acrylonitrile, from 2 to 15% by weight of a vinylpyridine, and from 2 to 15% by weight of vinyl acetate, methyl acrylate, acrylamide, methacrylamide, acrylic acid, methacrylic acid, methacrylonitrile, or other ethylenically unsaturated material.

Illustrative examples of vinyl-substituted tertiary heterocyclic amines that can be copolymerized with acrylonitrile, alone or with one or more other copolymerizable monomers, by the method of the present invention, include vinylpyridines represented by the formula (I) 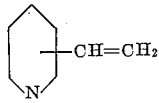

and which include 2-vinylpyridine, 3-vinylpyridine, and 4-vinylpyridine; methyl vinylpyridines represented by the formula (II) 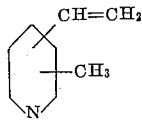

and which include 2-methyl-3-vinylpyridine,
2-methyl-5-vinylpyridine,
3-vinyl-4-methylpyridine,
3-vinyl-5-methylpyridine,
2-vinyl-3-methylpyridine,
2-vinyl-4-methylpyridine,
2-vinyl-5-methylpyridine,
2-vinyl-6-methylpyridine,
2-methyl-4-vinylpyridine, and
3-methyl-4-vinylpyridine.

The vinylpyridines embraced by Formula II are a preferred sub-group within a broader class of vinylpyridines that are advantageously employed in continuously making dyeable, fiber-foaming binary and ternary polymers in accordance with the instant invention and which may be represented by the formula (III) 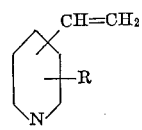

wherein R represents a lower alkyl radical, more particularly a methyl, ethyl, propyl (including n-propyl and isopropyl) or butyl (including n-butyl, isobutyl, sec.-butyl and tert.-butyl) radical. Other examples include the 2- and 4-vinylquinolines, the various vinyl isoquinolines, 2-vinyl-4, 6-dimethylpyridine, 2-vinyl-4,6-diethylpyridine, and others embraced by the formula (IV) 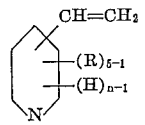

where R represents a lower alkyl radical, examples of which have been given hereinbefore, and $n$ represents an integer from 1 to 5, inclusive.

Illustrative examples of ethylenically unsaturated materials, more particularly such materials containing a $CH_2=CH<$ grouping, that are copolymerizable with acrylonitrile and a vinyl-substituted heterocycle tertiary amine include, in addition to those mentioned hereinbefore, those named in the aforementioned Cresswell, Mallison and other prior-art patents previously acknowledged; also, in Cresswell U.S. Patent No. 2,558,730 (col. 3, lines 31–55) and Price U.S. Patent No. 2,736,722 (col. 4, line 66 through line 27 in col. 5). Generally, the vinyl-substituted tertiary heterocyclic amine constitutes at least 2% by weight of the mixture of polymerizable materials, acrylontrile constitutes up to 98% by weight thereof, and a third different ethylenically (more particularly monoethylenically) unsaturated material constitutes from 0% to 30% by weight thereof.

We claim:

1. In a continuous method of preparing a polymer of polymerizable monomeric material comprising a major proportion by weight of acrylonitrile and a minor proportion by weight of at least one other ethylenically unsaturated material which is copolymerizable with acrylonitrile and which includes a vinyl-substituted heterocyclic tertiary amine, and wherein the said monomeric material is continuously polymerized in an aqueous acidic medium with the aid of a water-soluble polymerization catalyst, the improvement which comprises continuously carrying out the said polymerization in two stages which include (1) polymerization in a first zone wherein the concentration of said monomeric material in the aqueous acidic medium at the reaction temperature is such that all of the monomeric material charged to said zone is in solution in the said aqueous acidic medium and is within the range of, by weight, from about 1% to about 10% of the said aqueous medium, the residence time in the first zone of the charge thereto being from about 1 minute to about 10 minutes, and (2) polymerization in a main reaction zone that continuously receives the reaction mass from the first zone, as well as additional monomeric material to be polymerized that was not charged to the first zone, the total weight of polymerizable monomeric material charged to the main reaction zone being between about 15% and about 50% of the total material charged to the first and main reaction zones, the residence time in the main reaction zone being within the range of from about ½ to 2 hours; reaction conditions in each of said first zone and said main reaction zone being different to produce polymer of substantially uniform composition and substantially uniform molecular weight.

2. A process as defined in claim 1 wherein the percent vinyl-substituted heterocyclic tertiary amine fed to said first zone is smaller than the percent vinyl-substituted heterocyclic amine fed to said main reaction zone.

3. A process as defined in claim 1 wherein the pH in said first zone is lower than the pH in said main reaction zone.

4. A process as defined in claim 1 wherein the catalyst/monomer ratio employed in said first zone is lower than pre-reaction zone. The total weight of polymerizable monomeric material charged to the main reaction zone is between about 15% and about 50%, advantageously between about 20% and about 35%, of the total material (i.e., water, acid, catalyst and monomeric materials) charged to the pre-reaction and main reaction zones. The residence time in the main reaction zone is within the range of from about ½ to 2 hours, e.g., from about ¾ to 1½ hours.

The reaction temperature, i.e., the temperature of the reaction mass, in the pre-reaction zone and also in the main reaction zone is within the range of from about 20° C. to about 70° C., e.g., from about 35° C. to about 65° C.

As indicated above, the first 3 or 4% (approximately) of polymer that is formed contains more MVP (or of whatever other vinyl-substituted heterocyclic tertiary amine that is employed) and is of lower molecular weight than that of the average polymer formed in the reaction. To minimize the difference between the composition of the polymer initially formed and that of the final polymer, any or all of the following may be done especially when one uses the preferred redox-catalyst system described hereinbefore. (Where reference is made to MVP, it is to be understood that it is for purpose of illustrating only the basic monomer component, more particularly a vinyl-substituted heterocyclic tertiary amine.)

(1) The percent MVP fed to the pre-reactor advantageously may be kept smaller than the percent MVP fed to the main reactor. Or, otherwise stated, [MVP]/[total monomers] fed to the pre-reactor advantageously is less than [MVP]/[total monomers] fed to the main reactor.

(2) The total monomer concentration fed to the pre-reactor should not exceed the solubility of the monomers fed thereto, so that the [MVP]/[total monomer] ratio will be no higher in solution than that which is fed.

(3) Since the molecular weight of the polymer formed increases as the pH of the reaction mass decreases during polymerization, the pH in the pre-reactor advantageously is lower than the pH in the main reactor in order to increase the molecular weight of the initial polymer that is formed.

(4) As an alternative to (3) or in conjunction therewith, the molecular weight of the polymer formed in the pre-reactor can be increased by reducing the catalyst/monomer ratio employed in the pre-reactor as compared with that used in the main reactor.

In order that those skilled in the art may better understand how the present invention can be carried into effect, the following examples are given by way of illustration and not by way of limitation. All parts and percentages are by weight unless otherwise stated.

EXAMPLE 1

This example illustrates the kind of apparatus and continuous method commonly employed in producing an acrylonitrile polymer including copolymers of acrylonitrile and a vinyl-substituted heterocyclic tertiary amine, e.g., a vinylpyridine. Such apparatus and continuous method will, for brevity, sometimes be designated hereinafter as "standard" apparatus and method.

A water-jacketed reactor having a volume of 6.4 liters is supplied with a propeller-type stirrer, driven by a motor rotating at approximately 900 r.p.m. The reactor is equipped with a delivery-feed system, and, at its top, with an overflow tube. Polymer is collected by continuous filtration of the slurry overflow.

Six thousand four hundred (6,400) grams of water slurry containing 20% polymer prepared in a previous similar reaction ("seed" polymer) is charged to the reactor, adjusted to a pH of about 2 with nitric acid, and its temperature is brought to 45° C. A stream of monomers is introduced to the reactor through one of three delivery tubes. A second stream consists of an aqueous solution of weighed amounts of sodium chlorate and sodium sulfite. The third stream consists of an aqueous solution of nitric acid of known concentration.

Polymer produced during the first four hours is discarded. Under the conditions of reaction, it has been found that more than 92 percent of the seed polymer has been purged and that a steady state or equilibrium is set up before any polymer product is collected. The temperature of the reaction is maintained at 45° C. Monomer concentration and residence time are controlled by the feed rates at 28 percent monomer concentration and 84 minutes residence time in the reactor. The pH is maintained at 3.3.

The composition of the feeds is as follows:

Feed I—Catalyst (102.5 grams of $NaClO_3$ and 363.0 grams of $Na_2SO_3$ in solution in 16 liters of water)
Feed II—Monomer (85.0% acrylonitrile, 8.4% vinyl acetate, and 6.6% 4-vinyl-pyridine)
Feed III—Acid (512.5 grams of $HNO_3$ in solution in 16 liters of water)

Catalyst (Feed I) is fed at 1490 cc./hr., 1504 grams/hr. Therefore, the rate of $NaClO_3$/hr. is 4.86 grams/hr. and the rate of $Na_2SO_3$/hr. is 17.3 grams/hr. Monomer (Feed II) is fed at 1490 cc./hr., 1219 grams/hr. Acid (Feed III) is fed at 1600 cc./hr., 1630 grams/hr. At equilibrium, the conversion of monomer to polymer is 74 percent. The polymer has an average molecular weight of 78,000.

The remaining examples illustrate the method of the present invention. The apparatus used in practicing the polymerization methods of the various examples is described in detail in Example 2 which follows.

EXAMPLE 2

Polymerization is conducted in a reactor which consists of two water-jacketed vessels, one being from 10 to 150 times as large as the other. Each reactor is equipped with a propeller-type stirrer, with a delivery-feed system, and, at its top, with an overflow tube. The overflow tube from the first reactor is connected to a delivery tube to the second reactor so that the effluent from the first reactor is fed to the second reactor. In the examples described the second reactor has a volume of 6.4 liters and the volume of the first reactor (the prereactor) is varied from 0.05 liter to 0.25 liter.

Six thousand four hundred (6,400) grams of water slurry containing 20% polymer prepared in a previous similar reaction ("seed" polymer) is charged to the larger vessel (main reactor), adjusted to a pH of about 2 with nitric acid, and its temperature is brought to 45° C. The pre-reactor is filled with water and its temperature is brought to 45° C.

A solution of monomers is fed at different but predetermined rates to each of the reactors through a delivery tube leading to each reactor. A second feed, an aqueous solution of weighed amounts of sodium chlorate and sodium sulfite, is fed at different but predetermined rates to each of the reactors. The third stream consisting of an aqueous solution of nitric acid of known concentration is fed to the pre-reactor only. The effluent from the pre-reactor is fed to the larger or main reactor.

Polymer produced during the first four hours of reaction is discarded. Under the conditions of reaction, it has been found that more than 92 percent of the seed polymer has been purged and that a steady state or equilibrium is set up before any polymer product is collected. The temperature of the reaction is maintained at 45° C. The volume of the pre-reactor is 0.050 liter.

The composition of the feeds is as follows:

Feed I—Catalyst (48.6 grams of $NaClO_3$ and 172.0 grams of $Na_2SO_3$ in solution in 16 liters of water)

Feed II—Monomers (85.2% acrylonitrile, 6.8% 2-methyl-5-vinylpyridine and 8.0% vinyl acetate)

Feed III—Acid (358 grams of $HNO_3$ in solution in 16 liters of water)

Catalyst (Feed I) is fed to the pre-reactor at 150 cc./hr., 151.5 grams/hr. Therefore, the rate of $NaClO_3$/hr. is 0.456 gram/hr. and the rate of $Na_2SO_3$/hr. is 1.615 grams/hr. Monomer (Feed II) is fed to the pre-reactor at 146 cc./hr., 120 grams/hr. Acid (Feed III) is fed at 1660 cc./hr., 1695 grams/hr. to the pre-reactor. The monomer concentration and residence time in the pre-reactor are controlled by these feed rates at 6.1 percent monomer concentration and 1.53 minutes residence time. The product from the pre-reactor, 1966.5 grams/hr., is fed continuously to the main reactor. Catalyst (Feed I) is fed to the second reactor at 1510 cc./hr., 1525 grams/hr. Monomer (Feed II) is fed to the second reactor at 1479 cc./hr., 1213 grams/hr. The total catalyst fed (Feed I) is 1660 cc./hr., 1676.5 grams/hr. Therefore, the rate of $NaClO_3$/hr. is 5.04 grams/hr. and the rate of $Na_2SO_3$/hr. is 17.8 grams/hr. The total monomer fed is 1625 cc./hr., 1333 grams/hr. The total acid is fed at 1660 cc./hr., 1695 grams/hr. Monomer concentration and residence time in the second or main reactor are controlled by these feed rates at 28.3 percent monomer concentration and 77.5 minutes residence time. The pH in the main reactor is maintained at 3.3. The pH in the pre-reactor is below 3.3, more particularly between 1.0 and 2.8. At equilibrium, the conversion of monomer to polymer is 70% of theory. The polymer has an average molecular weight of 80,000.

EXAMPLE 3

The procedure used is the same as that employed in Example 2. The feed compositions used are likewise the same as those employed in the previous example. The volume of the pre-reactor is 0.060 liter.

Catalyst (Feed I) is fed to the pre-reactor at 170 cc./hr., 172 grams/hr. Therefore, the rate of $NaClO_3$/hr. is 0.516 gram/hr. and the rate of $Na_2SO_3$/hr. is 1.86 grams/hr. Monomer (Feed II) is fed at the pre-reactor at 170 cc./hr., 139 grams/hr. Acid (Feed III) is fed at 2135 cc./hr., 2180 grams/hr. to the pre-reactor. The monomer concentration and residence time in the pre-reactor are controlled by these feed rates at 5.6 percent monomer concentration and 1.45 minutes residence time. The product from the pre-reactor, 2491 grams/hr., is fed continuously to the main reactor. Catalyst (Feed I) is fed to the second or main reactor at 1810 cc./hr., 1830 grams/hr. Monomer (Feed II) is fed to the main reactor at 1810 cc./hr., 1485 grams/hr. The total catalyst fed (Feed I) is 1980 cc./hr., 2002 grams/hr. Therefore, the rate of $NaClO_3$/hr. is 6.01 grams/hr. and the rate of $Na_2SO_3$/hr. is 21.3 grams/hr. The total monomer fed is 1980 cc./hr., 1624 grams/hr. Monomer concentration and residence time in the main reactor are controlled by these feed rates at 28.0 percent monomer concentration and 63 minutes residence time. The pH in the main reactor is maintained at 3.3. The pH in the pre-reactor is below 3.3, more particularly between 1.0 and 2.8. At equilibrium, the conversion of monomer to polymer is 74% of theory. The polymer has an average molecular weight of 78,000.

EXAMPLE 4

The procedure used is the same as that in Example 2. The volume of the pre-reactor is 0.080 liter.

The composition of the feeds is as follows:

Feed I—Catalyst (52.3 grams of $NaClO_3$ and 185.5 grams of $Na_2SO_3$ in solution in 16 liters of water)

Feed II—Monomers (85.2% acrylonitrile, 6.8% 2-methyl-5-vinylpyridine and 8.0% vinyl acetate)

Feed III—Acid (342 grams of $HNO_3$ in solution in 16 liters of water)

Catalyst (Feed I) is fed to the pre-reactor at 170 cc./hr., 172 grams/hr. Therefore, the rate of $NaClO_3$/hr. is 0.557 gram/hr. and the rate of $Na_2SO_3$/hr. is 1.97 grams/hr. Monomer (Feed II) is fed to the pre-reactor at 170 cc./hr., 139 grams/hr. Acid (Feed III) is fed at 1600 cc./hr., 1630 grams/hr. to the pre-reactor. The monomer concentration and residence time in the pre-reactor are controlled by these feed rates at 7.2 percent monomer concentration and 2.48 minutes residence time. The product from the pre-reactor, 1941 grams/hr., is fed continuously to the main reactor. Catalyst (Feed I) is fed to the second or main reactor at 1320 cc./hr., 1332 grams/hr. Monomer (Feed II) is fed to the main reactor at 1320 cc./hr., 1080 grams/hr. The total catalyst fed (Feed I) is 1490 cc./hr., 1504 grams/hr. Therefore, the rate of $NaClO_3$/hr. is 4.86 grams/hr. and the rate of $Na_2SO_3$/hr. is 17.3 grams/hr. The total monomer fed is 1490 cc./hr. 1219 grams/hr. Monomer concentration and residence time in the main reactor are controlled by these feed rates at 28.0 percent monomer concentration and 84 minutes residence time. The pH in the main reactor is maintained at 3.3. The pH in the pre-reactor is below 3.3, more particularly between 1.0 and 2.8. At equilibrium, the conversion of monomer to polymer is 73% of theory. The polymer has an average molecular weight of 72,000.

EXAMPLE 5

Example 4 is repeated in every detail except that the volume of the pre-reactor is 0.100 liter. All operating conditions are the same as in Example 4 except that the residence time in the pre-reactor is 3.10 minutes. At equilibrium, the conversion of monomer to polymer is 72% of theory. The polymer has an average molecular weight of 79,500.

EXAMPLE 6

Example 4 is repeated in every detail except that the volume of the pre-reactor is 0.175 liter. All operating conditions are the same as in Example 4 except that the residence time in the pre-reactor is 5.41 minutes. At equilibrium the conversion of monomer to polymer is 67% of theory. The polymer has an average molecular weight of 80,000.

Tests were conducted in order to determine if the use of the pre-reactor reduced the amount of low-molecular-weight, water-soluble polymer which was formed. Data are given in the following table.

TABLE

| Polymer of Example | Pre-Reactor Residence Time (min.) | Relative Amount of Polymer Dissolved in Mother Liquor | Per Cent Acetone-Soluble Polymer | Dope Clarity* | Maximum Pullaway (meters/minute) |
|---|---|---|---|---|---|
| 1 | | 3 | 0.65 | 3 | 11.2 |
| 3 | 1.45 | 1½ | 0.54 | 2 | |
| 4 | 2.48 | ¼ | 0.53 | 1 | |
| 5 | 3.10 | ¼ | 0.61 | 0 | 13.0 |
| 6 | 5.41 | ⅛ | 0.55 | 0 | |

*Relative appearance or clarity: 0=clear; 1=slight haze; 2=faintly cloudy; 3=clarity normally obtained using standard apparatus and method.

The mother liquor from the reaction mass is made basic by the addition of dilute aqueous ammonia solution. Polymer which is soluble in water at pH 3 but not at pH above 7.0 coagulates to form a cloudy suspension. The relative amount of polymer is determined visually by comparison with previously prepared standards. Use of the pre-reactor reduces the amount of water-soluble polymer which is formed. Another measure of low-molecular-weight polymer is the determination of the percent polymer which is soluble in acetone. Use of a pre-reactor also reduces the amount of acetone-soluble polymer.

The polymers described in the examples may be converted to fibers following the general procedure described in, for instance, U.S. Patents Nos. 2,558,730, 2,558,731, and 2,558,733. Thus, a spinning solution comprised of ten parts of polymer, 45 parts of sodium thiocyanate, and 45 parts of water is extruded at a temperature of 95° C. through a 45-hole spinnerette at such a rate that 0.584 gram of polymer is extruded per minute. The maximum rate at which the gelled fiber can be collected without causing a break is considered to be the "maximum pullaway." Under standard conditions the fiber in gel state is collected at 10 meters/minute, washed free of solvent, and stretched during its passage through a hot water bath by passing it about a roll having a peripheral speed of 82.3 meters/minute. The stretched fiber is then dried and heated in relaxed state as described in the aforementioned patents, after which it is wound onto a bobbin at the rate of 70 meters per minute. The final denier of the fiber is 1.67/filament.

The ability of a polymer to form a good solution in aqueous sodium thiocyanate solution is indicated by the clarity of the "dope" solution which is formed. Polymer made using a pre-reactor results in solutions visually rated to be of excellent clarity. The "maximum pullaway" found for a filamentary material produced from the polymer of Example 5 is superior to that found for a filamentary material similarly produced from the polymer of Example 1, which latter polymer was produced using standard apparatus and continuous method.

When the polymers of Examples 1 and 5 are fractionated by ultracentrifugation from a dilute solution in dimethyl formamide, the polymer of Example 5 has a narrower molecular-weight distribution than the polymer of Example 1.

EXAMPLE 7

Essentially the same procedure is followed as described under each of Examples 1 through 6 with the exception that the copolymer is produced from the following copolymerizable monomeric materials in the stated weight percentages:

(a) 95% acrylonitrile and 5% of a mixture of 2- and 4-vinylquinolines
(b) 90% acrylonitrile and 10% 4-vinylpyridine
(c) 85% acrylonitrile and 15% 2-vinyl-5-ethylpyridine
(d) 80% acrylonitrile, 10% methyl acrylate and 10% 2-vinylpyridine
(e) 75% acrylonitrile, 12.5% acrylamide and 12.5% 2-methyl-5-vinylpyridine
(f) 70% acrylonitrile, 15% methyl methacrylate and 15% of a 50—50 mixture of 2- and 4-vinylpyridines
(g) 84% acrylonitrile, 8% methacrylamide and 8% 2-vinyl-5-ethylpyridine
(h) 90% acrylonitrile, 5% methacrylonitrile and 5% 2-methyl-5-vinylpyridine
(i) 86% acrylonitrile, 7% hydroxyethyl methacrylate and 7% 2-vinylpyridine.

Similar results are obtained.

It will be understood, of course, by those skilled in the art that our invention is not limited to the use of the particular ingredients and the particular conditions of reaction given solely by way of illustration in the foregoing examples. Thus, instead of the particular water-soluble polymerization catalyst, more particularly redox-catalyst system, employed in the illustrative examples, we may use any other water-soluble polymerization catalyst or catalyst system, numerous examples of which appear in the following U.S. patents: 2,436,926, Jacobson; 2,462,354, Brubaker and Jacobson; 2,628,223, Richards; 2,640,049, Rothrock; 2,748,106, Scheiderbauer et al.; 2,673,192, Hill; 2,751,374, Cresswell; and 2,777,832, Mallison. In these and other U.S. patents is disclosed the use of various peroxy compounds for polymerizing vinyl monomers including acrylonitrile; also, redox-catalyst systems comprising a peroxy compound and a sulfoxy compound, such as, for example, ammonium persulfate and sodium bisulfite; additionally, redox-catalyst systems comprising a water-soluble chlorate, e.g., sodium or potassium chlorate, and a water-soluble sulfite or bisulfite, e.g., sodium sulfite or bisulfite (see, for instance, the aforementioned U.S. patents to Hill, Cresswell and Mallison).

In practicing our invention we prefer to use an acidic aqueous catalyst system containing reducible chlorate ions and oxidizable sulfoxy ions, that is, a redox-catalyst system that includes as essential components (a) a water-soluble chlorine compound that yields chlorate ions in an aqueous acidic medium and (b) a water-soluble sulfoxy compound that yields oxidizable sulfoxy ions in an aqueous acidic medium.

The oxidizable sulfoxy ions used in the systems described in the preceding paragraph have generally been of the group consisting of sulfite, bisulfite, and hydrosulfite ions, and these same sulfoxy ions comprise a preferred group employed in practicing the present invention. However, it is not intended that the invention shall be limited to the use of only this group. While the components of an oxidation-reduction or redox-catalyst system of this nature may be introduced as chloric and sulfurous acids, these acids are relatively unstable; therefore, it is usually more convenient to add the desired ions to the polymerization system in the form of a water-soluble chlorate and a water-soluble salt containing the oxidizable sulfoxy ion, e.g., a water-soluble sulfite, together with a suitable aqueous acidic medium, for instance, one comprising an aqueous solution of a non-oxidizable acid having a dissociation constant greater than $10^{-3}$, e.g., sulfuric, phosphoric, nitric, hydrochloric, or other strong acid. During polymerization in an aqueous system containing a chlorate-sulfoxy catalyst combination, the chlorine is reduced and the sulfur simultaneously oxidized.

In the preferred redox-polymerization-catalyst system employed, the total amount of chlorate ions introduced to the reaction mass (that is, to both the pre-reactor and the main reactor) generally will be between about 0.1% and about 2.0% of the weight of the polymerizable monomeric material including acrylonitrile and one or more vinylpyridines or other vinyl-substituted tertiary heterocyclic amines, and the oxidizable ions, specifically sulfoxy ions, will be present in a quantity ranging between about 0.1% and about 6% by weight on the same basis. Larger amounts of the catalyst components, e.g., 3 or more percent of chlorate ions and 9 or more percent of sulfoxy ions, are operative, but appear to provide no additional benefits. When the oxidizing and reducing components are present in oxidation and reduction equivalents, then in the case of the preferred oxidizable component, 3 moles of the sulfurous acid or a sulfite react per mole of chloric acid or a chlorate. The ratio is the same for bisulfites but only 1.5 moles of a meta-bisulfite are required, since such salts ionize to form $HSO_3^-$ ions.

In the redox-polymerization-catalyst system preferred for use in practicing the present invention, any water-soluble chlorine compound that yields chlorate ions in an aqueous acidic medium can be used, for instance: chloric acid, ammonium, and the various alkali-metal (sodium, potassium, lithium, etc.) chlorates; and the various water-soluble, alkaline-earth metal and heavy metal chlorates.

Illustrative examples of reducing agents that can be employed are sulfites, bisulfites, and metabisulfites corresponding to the chlorates named in the preceding paragraph, sulfur dioxide, and diethyl and other water-soluble dialkyl sulfites.

By the term "sulfite ions" as used herein and in the appended claims is intended to be included the various sulfoxy species, more particularly $H_2SO_3$ and/or $HSO_3^-$ and $SO_3^=$, the proportionate amounts of these species being a function of pH. We believe that the active component is probably the $H_2SO_3$ molecule.

The polymerization temperature employed ranges from 20° C. to 70° C. Particularly good results are obtained when the temperature of polymerization is maintained within the range of from about 35° C. to about 65° C. The temperatures in the pre-reactor and in the main reactor may be the same or different within the aforementioned ranges.

It is desirable to conduct the process of the present invention in the absence of oxygen, which has a definite inhibiting effect on the polymerization reaction. Suitable inert gases, such as nitrogen and carbon dioxide, may be used to displace air in the reaction zone.

With the preferred redox-catalyst system, polymerization is effected in an aqueous medium having a pH of 4.0 or less, advantageously from about 2.0 to about 3.6. In some cases the pH in the pre-reactor advantageously is below 2.0 e.g., from 1.0 to 1.9.

In practicing the present invention to produce fiber-forming (fiber-formable) acrylonitrile copolymers, the monomeric material comprises more than 50%, more particularly at least 70%, by weight of acrylonitrile, while the remainder is constituted of at least one other different ethylenically unsaturated material which is copolymerizable with acrylonitrile and which includes a vinyl-substituted tertiary heterocyclic amine, e.g., a vinylpyridine. The present invention provides particularly good results in preparing a ternary polymer of monomeric material comprising at least 80% by weight of acrylonitrile, from 2 to 15% by weight of a vinylpyridine, and from 2 to 15% by weight of vinyl acetate, methyl acrylate, acrylamide, methacrylamide, acrylic acid, methacrylic acid, methacrylonitrile, or other ethylenically unsaturated material.

Illustrative examples of vinyl-substituted tertiary heterocyclic amines that can be copolymerized with acrylonitrile, alone or with one or more other copolymerizable monomers, by the method of the present invention, include vinylpyridines represented by the formula (I) 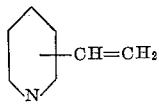

and which include 2-vinylpyridine, 3-vinylpyridine, and 4-vinylpyridine; methyl vinylpyridines represented by the formula (II) 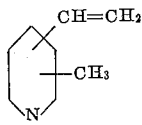

and which include 2-methyl-3-vinylpyridine,
2-methyl-5-vinylpyridine,
3-vinyl-4-methylpyridine,
3-vinyl-5-methylpyridine,
2-vinyl-3-methylpyridine,
2-vinyl-4-methylpyridine,
2-vinyl-5-methylpyridine,
2-vinyl-6-methylpyridine,
2-methyl-4-vinylpyridine, and
3-methyl-4-vinylpyridine.

The vinylpyridines embraced by Formula II are a preferred sub-group within a broader class of vinylpyridines that are advantageously employed in continuously making dyeable, fiber-foaming binary and ternary polymers in accordance with the instant invention and which may be represented by the formula (III) 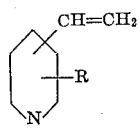

wherein R represents a lower alkyl radical, more particularly a methyl, ethyl, propyl (including n-propyl and isopropyl) or butyl (including n-butyl, isobutyl, sec.-butyl and tert.-butyl) radical. Other examples include the 2- and 4-vinylquinolines, the various vinyl isoquinolines, 2-vinyl-4, 6-dimethylpyridine, 2-vinyl-4,6-diethylpyridine, and others embraced by the formula (IV) 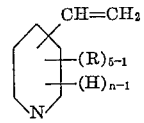

where R represents a lower alkyl radical, examples of which have been given hereinbefore, and $n$ represents an integer from 1 to 5, inclusive.

Illustrative examples of ethylenically unsaturated materials, more particularly such materials containing a $CH_2{=}CH{<}$ grouping, that are copolymerizable with acrylonitrile and a vinyl-substituted heterocycle tertiary amine include, in addition to those mentioned hereinbefore, those named in the aforementioned Cresswell, Mallison and other prior-art patents previously acknowledged; also, in Cresswell U.S. Patent No. 2,558,730 (col. 3, lines 31–55) and Price U.S. Patent No. 2,736,722 (col. 4, line 66 through line 27 in col. 5). Generally, the vinyl-substituted tertiary heterocyclic amine constitutes at least 2% by weight of the mixture of polymerizable materials, acrylontrile constitutes up to 98% by weight thereof, and a third different ethylenically (more particularly monoethylenically) unsaturated material constitutes from 0% to 30% by weight thereof.

We claim:

1. In a continuous method of preparing a polymer of polymerizable monomeric material comprising a major proportion by weight of acrylonitrile and a minor proportion by weight of at least one other ethylenically unsaturated material which is copolymerizable with acrylonitrile and which includes a vinyl-substituted heterocyclic tertiary amine, and wherein the said monomeric material is continuously polymerized in an aqueous acidic medium with the aid of a water-soluble polymerization catalyst, the improvement which comprises continuously carrying out the said polymerization in two stages which include (1) polymerization in a first zone wherein the concentration of said monomeric material in the aqueous acidic medium at the reaction temperature is such that all of the monomeric material charged to said zone is in solution in the said aqueous acidic medium and is within the range of, by weight, from about 1% to about 10% of the said aqueous medium, the residence time in the first zone of the charge thereto being from about 1 minute to about 10 minutes, and (2) polymerization in a main reaction zone that continuously receives the reaction mass from the first zone, as well as additional monomeric material to be polymerized that was not charged to the first zone, the total weight of polymerizable monomeric material charged to the main reaction zone being between about 15% and about 50% of the total material charged to the first and main reaction zones, the residence time in the main reaction zone being within the range of from about ½ to 2 hours; reaction conditions in each of said first zone and said main reaction zone being different to produce polymer of substantially uniform composition and substantially uniform molecular weight.

2. A process as defined in claim 1 wherein the percent vinyl-substituted heterocyclic tertiary amine fed to said first zone is smaller than the percent vinyl-substituted heterocyclic amine fed to said main reaction zone.

3. A process as defined in claim 1 wherein the pH in said first zone is lower than the pH in said main reaction zone.

4. A process as defined in claim 1 wherein the catalyst/monomer ratio employed in said first zone is lower than the catalyst/monomer ratio employed in said main reaction zone.

5. A process as defined in claim 4 wherein the pH in said first zone is lower than the pH in said main reaction zone.

References Cited by the Examiner
UNITED STATES PATENTS

| | | | |
|---|---|---|---|
| 2,537,030 | 1/1951 | Chaney | 260—88.3 |
| 2,895,949 | 7/1959 | Thomas | 260—80.5 |
| 3,028,372 | 4/1962 | Kocay et al. | 260—85.5 |
| 3,065,211 | 11/1962 | Milford et al. | 260—85.5 |
| 3,120,504 | 2/1964 | Jarovitzky et al. | 260—85.5 |

JOSEPH L. SCHOFER, *Primary Examiner.*

LOUISE P. QUAST, *Examiner.*

H. WONG, *Assistant Examiner.*